United States Patent
Jones et al.

(10) Patent No.: US 12,480,623 B2
(45) Date of Patent: Nov. 25, 2025

(54) PRESSURE REGULATOR

(71) Applicant: ENTEGRIS, INC., Billerica, MA (US)

(72) Inventors: Edward E. Jones, Woodbury, CT (US); Sanado Barolli, Bethlehem, CT (US); Blake Edmund Johnson, Andover, MN (US); Joseph Kevin Kenney, Bethel, CT (US)

(73) Assignee: ENTEGRIS, INC., Billerica, MA (US)

( * ) Notice: Subject to any disclaimer, the term of this patent is extended or adjusted under 35 U.S.C. 154(b) by 18 days.

(21) Appl. No.: 18/420,669

(22) Filed: Jan. 23, 2024

(65) Prior Publication Data
US 2024/0247762 A1    Jul. 25, 2024

Related U.S. Application Data

(60) Provisional application No. 63/440,753, filed on Jan. 24, 2023.

(51) Int. Cl.
*F17C 13/04*    (2006.01)

(52) U.S. Cl.
CPC ...... *F17C 13/04* (2013.01); *F17C 2201/0104* (2013.01); *F17C 2205/0391* (2013.01); *F17C 2250/0626* (2013.01)

(58) Field of Classification Search
CPC .............. F17C 13/04; F17C 2205/0391; F17C 2205/0338
See application file for complete search history.

(56) References Cited

U.S. PATENT DOCUMENTS

| | | | | |
|---|---|---|---|---|
| 3,712,332 A | * | 1/1973 | Galbraith | F16K 31/56 137/505.46 |
| 4,791,957 A | * | 12/1988 | Ross | F17C 13/04 137/505.12 |
| 5,033,505 A | * | 7/1991 | Eidsmore | F16K 31/086 137/906 |
| 5,065,788 A | * | 11/1991 | McManigal | G05D 16/0655 137/505.11 |
| 5,186,209 A | * | 2/1993 | McManigal | G05D 16/0672 137/505.11 |
| 5,303,734 A | * | 4/1994 | Eidsmore | G05D 16/0616 251/80 |

(Continued)

FOREIGN PATENT DOCUMENTS

| | | |
|---|---|---|
| CN | 114688324 A | 7/2022 |
| CN | 217003264 U | 7/2022 |
| JP | H02227537 A | 9/1990 |

Primary Examiner — Kenneth Rinehart
Assistant Examiner — Nicole Gardner

(57) ABSTRACT

A device includes a housing including a first chamber having a first pressure regulating device, a first fluid inlet, and a first fluid outlet. The first pressure regulating device includes a plurality of first levers; a first spring; and a first pressure activated device. In response to an external pressure decreasing, the first pressure activated device overcomes a first closing force and opens the first fluid inlet. A second chamber has a second pressure regulating device including a second fluid inlet and a second fluid outlet; a plurality of second levers; a second spring; and a second pressure activated device configured to constrict as the external pressure increases. In response to the external pressure decreasing, the second pressure activated device is configured to overcome a second closing force and open the second fluid inlet.

17 Claims, 4 Drawing Sheets

(56) References Cited

U.S. PATENT DOCUMENTS

| | | | | |
|---|---|---|---|---|
| 6,089,027 A * | 7/2000 | Wang | | F17C 7/00 62/48.1 |
| 6,257,000 B1 * | 7/2001 | Wang | | F17C 7/00 62/48.1 |
| 6,296,008 B1 * | 10/2001 | Boyer | | F17C 13/045 251/73 |
| 6,343,476 B1 * | 2/2002 | Wang | | F17C 13/02 62/48.1 |
| 6,523,565 B2 * | 2/2003 | Girouard | | G05D 16/0402 137/505.43 |
| 7,165,573 B2 * | 1/2007 | Gotthelf | | G05D 16/0669 137/505.34 |
| 11,892,860 B1 | 2/2024 | Eidsmore | | G05D 16/0622 |
| 2002/0014227 A1 * | 2/2002 | Girouard | | G05D 7/0635 123/527 |
| 2002/0050142 A1 * | 5/2002 | Wang | | F17C 7/04 62/48.1 |
| 2004/0000338 A1 * | 1/2004 | Heiderman | | F17C 13/04 137/494 |
| 2010/0018915 A1 * | 1/2010 | DiPrizio | | B01D 71/36 210/455 |
| 2015/0247605 A1 * | 9/2015 | Despres | | F17C 13/04 222/402.1 |
| 2016/0258537 A1 | 9/2016 | Heiderman et al. | | |
| 2017/0122496 A1 * | 5/2017 | Scannell | | F17C 13/04 |
| 2017/0248275 A1 * | 8/2017 | Despres | | F17C 1/00 |
| 2018/0180225 A1 | 6/2018 | Despres et al. | | |
| 2019/0078696 A1 * | 3/2019 | Tom | | F16K 37/0025 |
| 2019/0339726 A1 * | 11/2019 | Jones | | G05D 16/0608 |
| 2020/0088352 A1 * | 3/2020 | Despres | | F17C 11/00 |
| 2020/0284364 A1 * | 9/2020 | Yu | | F17C 13/04 |
| 2021/0071818 A1 * | 3/2021 | Arno | | F17C 11/00 |
| 2021/0341106 A1 * | 11/2021 | Jones | | G01M 13/003 |
| 2022/0290812 A1 * | 9/2022 | Jones | | F17C 7/00 |
| 2024/0011605 A1 * | 1/2024 | Schmitz | | F17C 13/04 |

* cited by examiner

PRESSURE REGULATOR

FIELD

The present disclosure relates to pressure management for a fluid vessel. More specifically, the present disclosure relates to a pressure regulator for a fluid vessel to control pressure during fluid dispensing from the fluid vessel.

BACKGROUND

Various fluid supply packages can be used to provide process fluids for use in semiconductor manufacturing. As a result of safety and process efficiency considerations, fluid supply packages have been developed that utilize fluid storage and dispensing vessels in which pressure-regulating devices are provided in the interior volume of the vessel or the vessel valve head.

Pressure-regulated vessels coupled to flow circuitry can exhibit sudden pressure fluctuations upon initiation of fluid dispensing operation. This anomalous behavior is most frequently experienced as a pressure spike that is sensed by pressure sensing components in the flow circuitry.

SUMMARY

In some embodiments, a device includes a housing. In some embodiments, the housing includes a first chamber having a first pressure regulating device. In some embodiments, the first chamber includes a first fluid inlet and a first fluid outlet. In some embodiments, the first pressure regulating device includes a plurality of first levers. In some embodiments, the first pressure regulating device includes a first spring having a first spring force. In some embodiments, the first spring force is configured to provide a first closing force for closing the first fluid inlet. In some embodiments, the first pressure regulating device includes a first pressure activated device. In some embodiments, the first pressure activated device is configured to constrict as an external pressure increases. In some embodiments, in response to the external pressure decreasing, the first pressure activated device is configured to overcome the first closing force and open the first fluid inlet. In some embodiments, the housing includes a second chamber having a second pressure regulating device. In some embodiments, the second chamber includes a second fluid inlet and a second fluid outlet. In some embodiments, the second pressure regulating device includes a plurality of second levers and a second spring having a second spring force. In some embodiments, the second spring force is configured to provide a second closing force for closing the second fluid inlet. In some embodiments, the second pressure regulating device includes a second pressure activated device. In some embodiments, the second pressure activated device is configured to constrict as the external pressure increases. In some embodiments, in response to the external pressure decreasing, the second pressure activated device is configured to overcome the second closing force and open the second fluid inlet.

In some embodiments, the device includes a filter disposed at the first fluid inlet or at the second fluid inlet.

In some embodiments, the first spring is a wave spring.

In some embodiments, the device includes an adjustment mechanism configured to modify an outlet pressure of a fluid exiting the second pressure regulating device.

In some embodiments, a transition from an idle state to a flowing state is smooth.

In some embodiments, the device is configured for sub-atmospheric pressure delivery.

In some embodiments, the first pressure activated device includes one or more of a bellows, a diaphragm, a spring, or a combination thereof.

In some embodiments, the second pressure activated device includes one or more of a bellows, a diaphragm, a spring, or a combination thereof.

In some embodiments, the first spring includes a plurality of first springs.

In some embodiments, an assembly includes a pressure-regulated vessel and a pressure regulator. In some embodiments, the pressure regulator includes a housing. In some embodiments, the housing includes a first chamber having a first pressure regulating device. In some embodiments, the first chamber includes a first fluid inlet and a first fluid outlet. In some embodiments, the first pressure regulating device includes a plurality of first levers and a first spring having a first spring force. In some embodiments, the first spring force is configured to provide a first closing force for closing the first fluid inlet. In some embodiments, the first pressure regulating device includes a first pressure activated device. In some embodiments, the first pressure activated device is configured to constrict as an external pressure increases. In some embodiments, in response to the external pressure increasing, the first pressure activated device is configured to overcome the first closing force and open the first fluid inlet. In some embodiments, the pressure regulator includes a second chamber having a second pressure regulating device. In some embodiments, the second chamber includes a second fluid inlet and a second fluid outlet. In some embodiments, the second pressure regulating device includes a plurality of second levers and a second spring having a second spring force. In some embodiments, the second spring force is configured to provide a second closing force for closing the second fluid inlet. In some embodiments, the second pressure regulating device includes a second pressure activated device. In some embodiments, the second pressure activated device is configured to constrict as the external pressure increases. In some embodiments, in response to the external pressure increasing, the second pressure activated device is configured to overcome the second closing force and open the second fluid inlet.

In some embodiments, a filter is disposed at the first fluid inlet or the second fluid inlet.

In some embodiments, the assembly includes a filter.

In some embodiments, an adjustment mechanism is configured to modify an outlet pressure of a fluid exiting the second pressure regulating device.

In some embodiments, a transition from an idle state to a flowing state is smooth.

In some embodiments, the pressure regulator is configured for sub-atmospheric pressure delivery.

In some embodiments, the first pressure activated device includes one or more of a bellows, a diaphragm, a spring, or a combination thereof.

In some embodiments, the second pressure activated device includes one or more of a bellows, a diaphragm, a spring, or a combination thereof.

In some embodiments, the first spring includes a plurality of first springs.

In some embodiments, the plurality of levers is formed of a rigid low friction material.

In some embodiments, the assembly is configured for delivering a hazardous material used in manufacturing a semiconductor device.

BRIEF DESCRIPTION OF THE DRAWINGS

Some embodiments of the disclosure are herein described, by way of example, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

Like reference numbers represent the same or similar parts throughout.

DETAILED DESCRIPTION

Manufacturing processes such as, but not limited to, semiconductor manufacturing processes, often use fluid delivery systems in which a fluid is stored in a vessel then delivered to specialized equipment. The specialized equipment can be sensitive to fluctuations in flow rate. For example, a rapid or constant change of pressure can result in a condition where a downstream mass flow controller is unable to maintain a constant setpoint. This condition can be heightened when dealing with fluid delivery at lower flow rates (e.g., flow rates of 2 cm$^3$/min to 3 cm$^3$/min). Spikes or oscillations in the flow control can interrupt the specialized equipment and result in an alarm condition that stops the manufacturing process. This can, for example, result in rework of a product being manufactured.

Embodiments of this disclosure are directed to a device configured to provide a smooth transition between an idle state and a flowing state. In some embodiments, the device (e.g., a pressure regulator) can reduce a risk of reaching alarm conditions that interrupt the manufacturing process. As a result, in some embodiments, less rework in the manufacturing process may be needed.

In some embodiments, the device is configured for sub-atmospheric pressure delivery. In some embodiments, a sub-atmospheric pressure is less than 760 Torr. It is to be appreciated that embodiments of this disclosure can be applied to different pressures, such as those greater than 760 Torr.

As used herein, a "smooth transition between the idle state and the flowing state" can include a pressure variation of less than 10 Torr/s, a deviation of less than 5 Torr/s, or a deviation of less than 1 Torr/s.

Figure 1:
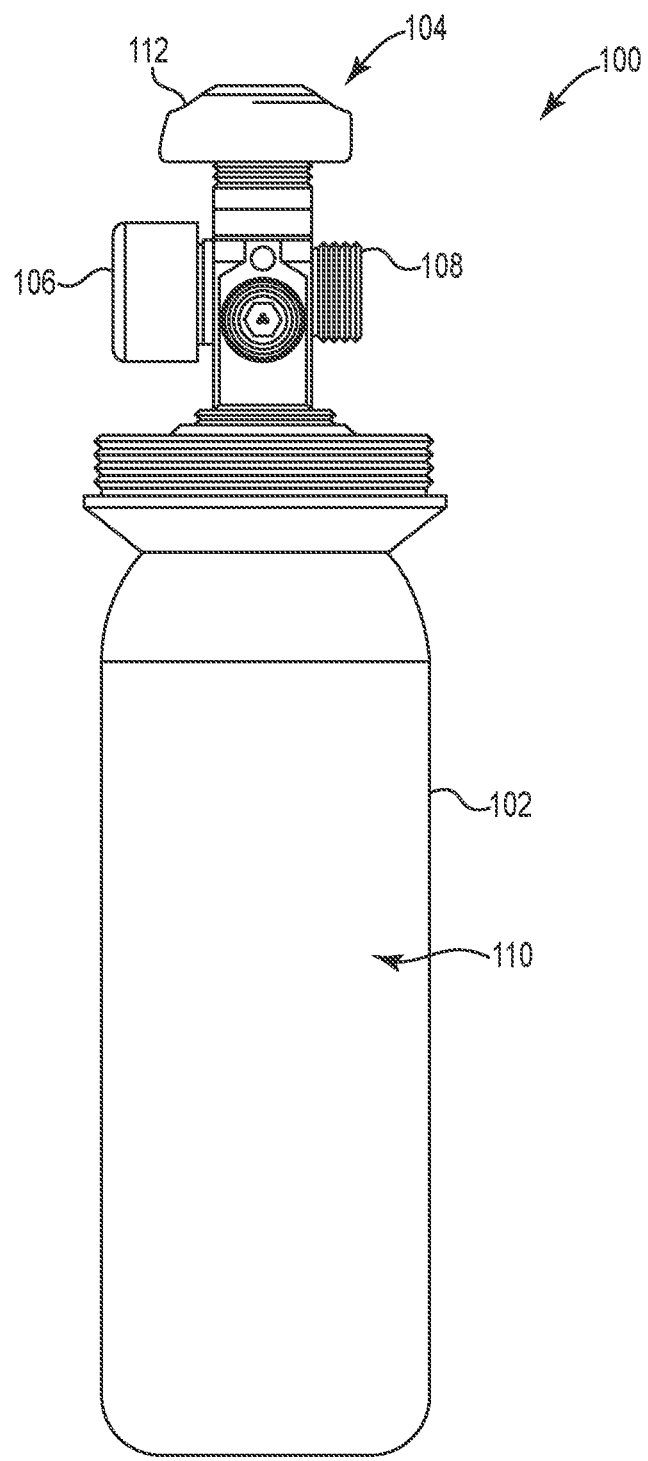
FIG. 1 shows a fluid delivery system, according to some embodiments.
Figure 2:
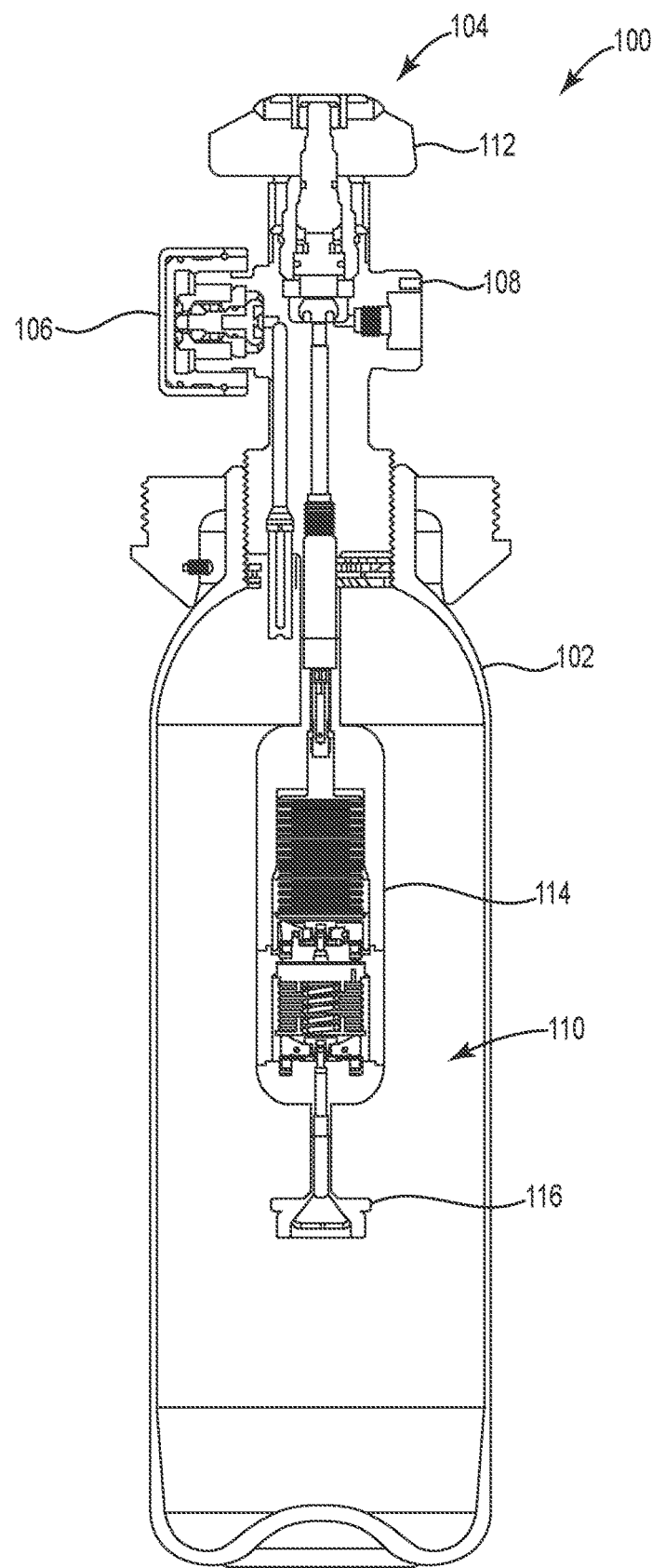
FIG. 2 shows a sectional view of the fluid delivery system of FIG. 1, according to some embodiments.

FIG. 1 shows a fluid delivery system 100, according to some embodiments. FIG. 2 shows a sectional view of the fluid delivery system 100, according to some embodiments. For simplicity of this Specification, FIG. 1 and FIG. 2 will be described collectively unless specific reference is made otherwise.

The fluid delivery system 100 can be used to, for example, store and deliver a pressurized fluid that is maintained at a sub-atmospheric pressure level. In some embodiments, the fluid delivery system 100 can be used, for example, in manufacturing of semiconductor devices or the like. Equipment using the fluid in the fluid delivery system 100 can be sensitive to pressure fluctuations. Accordingly, embodiments described herein can provide a smooth transition between an idle state and a flowing state. As a result, embodiments herein may improve a functionality of the fluid delivery system 100 and may reduce problems within the manufacturing equipment used with the fluid delivery system 100.

In the illustrated embodiment, the fluid delivery system 100 includes a pressure-regulated vessel 102 configured to store a pressurized fluid. In some embodiments, the pressure-regulated vessel 102 can be referred to as a cylinder. In some embodiments, the pressurized fluid is stored at a sub-atmospheric pressure. In some embodiments, the pressurized fluid is in a gaseous or partially gaseous phase.

The fluid delivery system 100 includes a valve head 104. In some embodiments, the valve head 104 can be engaged via threads at an end (e.g., a top end) of the pressure-regulated vessel 102. The valve head 104 can include an inlet 106 via which the pressure-regulated vessel 102 can be filled with fluid. The fluid can be discharged from an interior 110 of the pressure-regulated vessel 102 through an outlet 108. The valve head 104 also includes a handle 112 configured to allow control of the fluid exiting through outlet 108.

Although not shown in the illustrated embodiment, it is to be appreciated that the outlet 108 can be connected to conduit to fluidly connect the fluid delivery system 100 with equipment such as, but not limited to, equipment used in semiconductor manufacturing (e.g., ion implantation, etc.). Additionally, one or more pressure transducers and mass flow rate controllers can be included along the conduit to measure and provide alerts if the pressure fluctuates beyond acceptable limits.

As shown in FIG. 2, the fluid delivery system 100 includes a device 114 within the interior 110 of the pressure-regulated vessel 102. The device 114 can be referred to as a valve assembly or the like. In some embodiments, the device 114 can be referred to as a pressure regulator. In some embodiments, the device 114 can enable or disable the discharge flow path through outlet 108. The device 114 is specifically configured to enable a smooth transition between the idle state and the flowing state. The device 114 is shown and described in additional detail in accordance with FIG. 3 and FIG. 4 below.

The fluid delivery system 100 can also include a filter 116 disposed within the interior 110 of the pressure-regulated vessel 102. It is to be appreciated that one or more filters can be included at other locations within the fluid delivery system 100 such as, but not limited to, at the outlet 108 or the like.

Figure 3:
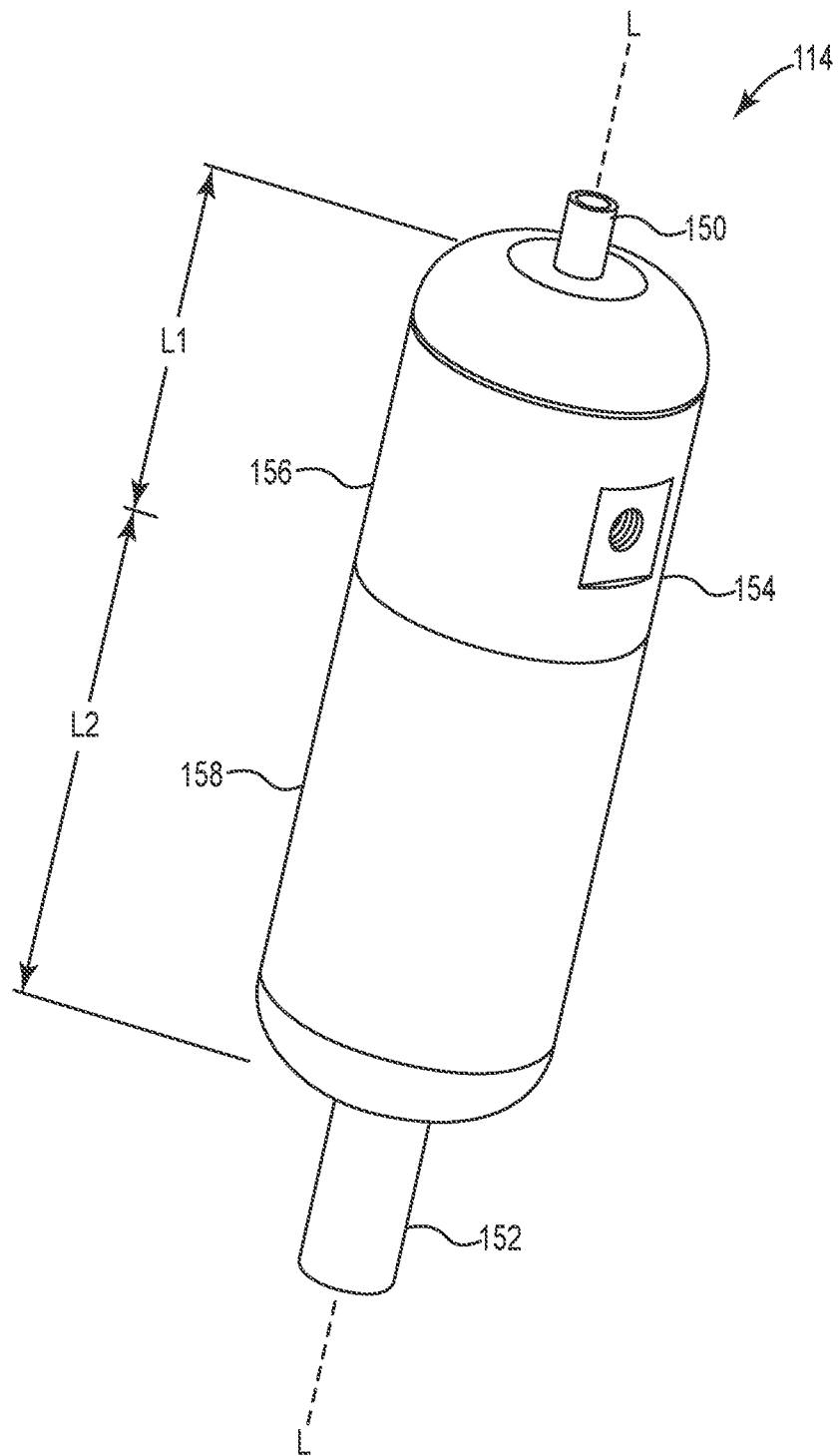
FIG. 3 shows a perspective view of a device, according to some embodiments.
Figure 4:
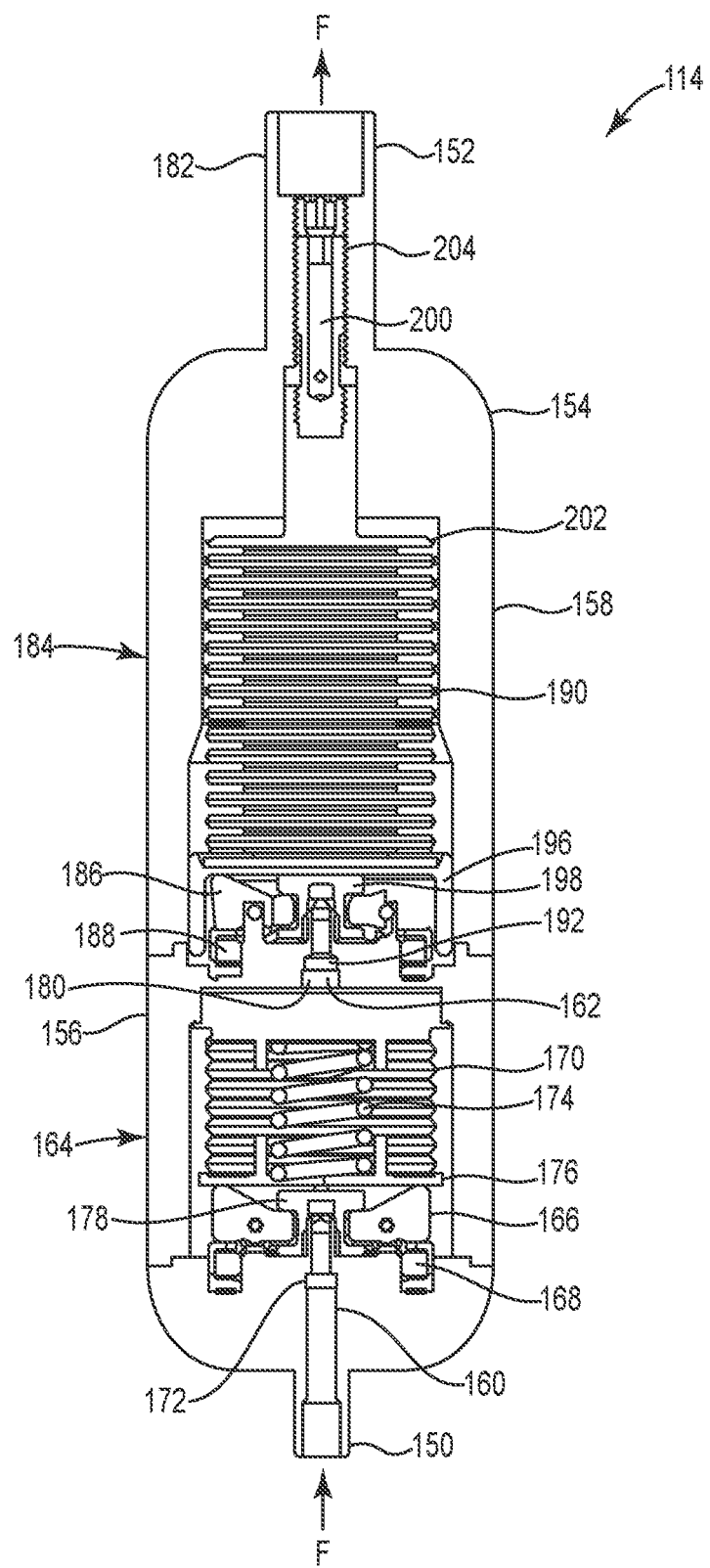
FIG. 4 shows a sectional view of the device of FIG. 3, according to some embodiments.

FIG. 3 shows a perspective view of the device 114, according to some embodiments. FIG. 4 shows a sectional view of the device 114, according to some embodiments. For simplicity of this Specification, FIG. 3 and FIG. 4 will be described collectively unless specific reference is made otherwise.

The device 114 includes an inlet 150 and an outlet 152 from a housing 154. The inlet 150 is fluidly connected to the outlet 152 such that a fluid in the interior 110 of the pressure-regulated vessel 102 (FIG. 1, FIG. 2) is able to flow from the inlet 150 to the outlet 152 through the housing 154. In some embodiments, the inlet 150 can be fluidly connected to another component such as, but not limited to, the filter 116 (FIG. 2).

In some embodiments, the device 114 can include multiple chambers. For example, the housing 154 of the device 114 can be divided to include a chamber 156 and a chamber 158. In the illustrated embodiment, a length L1 of the chamber 156 along a direction of a longitudinal axis L-L of the housing 154 can be different than a length L2 of the chamber 158 along the longitudinal axis L-L. In some embodiments, the length L1 and the length L2 can be the same.

In some embodiments, features disposed within the chamber 156 and features disposed within the chamber 158 can be similar or the same. In some embodiments, by having the chamber 156 and the chamber 158, the device 114 can be referred to as a dual stage pressure regulator. In some embodiments, the device 114 is designed to have multiple stages for controlling the pressure at the outlet 152. In some embodiments, having multiple stages can provide for a constant outlet pressure device even though the inlet pressure can vary.

The chamber 156 includes an inlet 160 and an outlet 162. The inlet 160 is fluidly connected to the inlet 150 and correspondingly, the interior 110 of the pressure-regulated vessel 102 (FIG. 2).

Within an interior of the chamber 156, disposed between the inlet 160 and the outlet 162, is a pressure regulating device 164. In some embodiments, the device 164 includes a plurality of levers 166. In some embodiments, the chamber 156 can include two of the levers 166, three of the levers 166, four of the levers 166, or more than four of the levers 166. In some embodiments, four of the levers 166 can be preferred for stability. In some embodiments, the levers 166 are formed of a rigid low friction material. In some embodiments, the levers 166 are formed of polytetrafluoroethylene (PTFE) or the like.

In some embodiments, the device 164 includes a spring 168. In some embodiments, the spring 168 includes a plurality of springs. In some embodiments, the spring 168 can be a wave spring or the like.

In some embodiments, the device 164 includes a pressure activated device 170. In some embodiments, the pressure activated device 170 can include, for example, a bellows, a diaphragm, a spring, or any combination thereof.

Collectively, the components of the device 164 are selected such that, in some embodiments, the device 164 has a first closing force acting on the inlet 160. The first closing force is selected to maintain the device 164 in the idle state. In some embodiments, the pressure activated device 170 is configured to constrict when an external pressure on the pressure activated device 170 increases. In operation, when the external pressure on the pressure activated device 170 decreases, the pressure activated device 170 is configured to apply a force that is greater than the first closing force acting on the inlet 160. As a result, fluid flow is enabled in the chamber 156 (i.e., from the inlet 160 to the outlet 162).

In some embodiments, the chamber 156 optionally includes a filter 172. The filter 172 can be configured to remove contaminants from the fluid in the pressure-regulated vessel 102 (FIG. 1, FIG. 2).

In some embodiments, the pressure activated device 170 can additionally include a spring 174. In the illustrated embodiment, the spring 174 is a coil spring. In some embodiments, the spring 174 can work in conjunction with the pressure activated device 170 to provide the first closing force acting on the inlet 160. Parameters of the spring 174 can be selected to work in conjunction with the pressure activated device 170.

In some embodiments, the levers 166 apply a force on a member 176. The member 176 receives a force from the spring 168 via the levers 166. In some embodiments, the pressure activated device 170 applies a force on an opposite side of the member 176. In some embodiments, the member 176 can move in a direction opposite of the flow F to unseat sealing member 178 and enable fluid flow when the force applied by the pressure activated device 170 is greater than the force applied via the levers 166 and the spring 168. When the force applied via the levers 166 and the spring 168 is greater, the device 114 is in the idle state.

The chamber 158 includes an inlet 180 and an outlet 182. The inlet 180 is fluidly connected to the outlet 162 of the chamber 156 and correspondingly, the interior 110 of the pressure-regulated vessel 102 (FIG. 2).

Within an interior of the chamber 158, disposed between the inlet 180 and the outlet 182 is a pressure regulating device 184. In some embodiments, the device 184 includes a plurality of levers 186. In some embodiments, the chamber 158 can include two of the levers 186, three of the levers 186, four of the levers 186, or more than four of the levers 186. In some embodiments, four of the levers 186 can be preferred for stability. In some embodiments, the levers 186 are formed of a rigid low friction material. In some embodiments, the levers 186 are formed of polytetrafluoroethylene (PTFE) or the like.

In some embodiments, the device 184 includes a spring 188. In some embodiments, the spring 188 includes a plurality of springs. In some embodiments, the spring 188 can be a wave spring or the like.

In some embodiments, the device 184 includes a pressure activated device 190. In some embodiments, the pressure activated device 190 can include, for example, a bellows, a diaphragm, a spring, or any combination thereof.

Collectively, the components of the device 184 are selected such that, in some embodiments, the device 184 has a first closing force acting on the inlet 180. The first closing force is selected to maintain the device 184 in the idle state. In some embodiments, the pressure activated device 190 is configured to constrict when an external pressure on the pressure activated device 190 increases. In operation, when the external pressure on the pressure activated device 190 decreases, the pressure activated device 190 is configured to apply a force that is greater than the first closing force acting on the inlet 180. As a result, fluid flow is enabled in the chamber 158 (i.e., from the inlet 180 to the outlet 182).

In some embodiments, the chamber 158 optionally includes a filter 192. The filter 192 can be configured to remove contaminants from the fluid in the pressure-regulated vessel 102 (FIG. 1, FIG. 2).

In some embodiments, the levers 186 apply a force on a member 196. The member 196 receives a force from the spring 188 via the levers 186. In some embodiments, the pressure activated device 190 applies a force on an opposite side of the member 196. In some embodiments, the member 196 can move in a direction opposite of the flow F to unseat sealing member 198 and enable fluid flow when the force applied by the pressure activated device 190 is greater than the force applied via the levers 186 and the spring 188. When the force applied via the levers 186 and the spring 188 is greater, the device 114 is in the idle state.

In some embodiments, the pressure activated device 190 may include an adjustment mechanism so that the device 184 is adjustable to operate at different pressures. For example, the device 114 can include a threaded stem 200. The threaded stem 200 can be rotated to move a member 202 toward the member 196 (constricting the pressure activated device 190) or away from the member 196 (relaxing the pressure activated device 190). In some embodiments, the threaded stem 200 can be within a larger threaded stem 204 so that a tool can be inserted into the larger threaded stem 204 to get to the threaded stem 200. In some embodiments, this adjustment can be performed even when the device 114 is installed within the pressure-regulated vessel 102. In some embodiments, the adjustment results in a different outlet pressure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

What is claimed is:

1. A device, comprising:
   a housing, comprising:
      a first chamber having a first pressure regulating device,
         wherein the first chamber comprises a first fluid inlet and a first fluid outlet;
         wherein the first pressure regulating device comprises:
            a plurality of first levers;
            a first spring having a first spring force;
               wherein the first spring force is configured to provide a first closing force for closing the first fluid inlet;
            a first pressure activated device;
               wherein the first pressure activated device is configured to constrict as an external pressure increases;
            wherein in response to the external pressure decreasing, the first pressure activated device is configured to overcome the first closing force and open the first fluid inlet; and
      a second chamber having a second pressure regulating device;
         wherein the second chamber comprises a second fluid inlet and a second fluid outlet;
         wherein the second pressure regulating device comprises:
            a plurality of second levers;
            a second spring having a second spring force;
               wherein the second spring force is configured to provide a second closing force for closing the second fluid inlet;
            a second pressure activated device;
               wherein the second pressure activated device is configured to constrict as the external pressure increases;
            wherein in response to the external pressure decreasing, the second pressure activated device is configured to overcome the second closing force and open the second fluid inlet.

2. The device of claim 1, further comprising a filter disposed at the first fluid inlet or at the second fluid inlet.

3. The device of claim 1, wherein the first spring is a wave spring.

4. The device of claim 1, further comprising an adjustment mechanism configured to modify an outlet pressure of a fluid exiting the second pressure regulating device.

5. The device of claim 1, wherein the device is configured for sub-atmospheric pressure delivery.

6. The device of claim 1, wherein the first pressure activated device includes one or more of a bellows, a diaphragm, a spring, or a combination thereof.

7. The device of claim 1, wherein the second pressure activated device includes one or more of a bellows, a diaphragm, a spring, or a combination thereof.

8. The device of claim 1, wherein the first spring comprises a plurality of first springs.

9. An assembly, comprising:
   a pressure-regulated vessel; and
   a pressure regulator, comprising:
      a housing, comprising:
         a first chamber having a first pressure regulating device,
            wherein the first chamber comprises a first fluid inlet and a first fluid outlet;
            wherein the first pressure regulating device comprises:

a plurality of first levers;
a first spring having a first spring force;
  wherein the first spring force is configured to provide a first closing force for closing the first fluid inlet;
a first pressure activated device;
  wherein the first pressure activated device is configured to constrict as an external pressure increases;
  wherein in response to the external pressure increasing, the first pressure activated device is configured to overcome the first closing force and open the first fluid inlet; and
a second chamber having a second pressure regulating device;
  wherein the second chamber comprises a second fluid inlet and a second fluid outlet;
  wherein the second pressure regulating device comprises:
    a plurality of second levers;
    a second spring having a second spring force;
      wherein the second spring force is configured to provide a second closing force for closing the second fluid inlet;
    a second pressure activated device;
      wherein the second pressure activated device is configured to constrict as the external pressure increases;
      wherein in response to the external pressure increasing, the second pressure activated device is configured to overcome the second closing force and open the second fluid inlet.

10. The assembly of claim 9, further comprising a filter disposed at the first fluid inlet or the second fluid inlet.

11. The assembly of claim 9, further comprising a filter.

12. The assembly of claim 9, further comprising an adjustment mechanism configured to modify an outlet pressure of a fluid exiting the second pressure regulating device.

13. The assembly of claim 9, wherein the pressure regulator is configured for sub-atmospheric pressure delivery.

14. The assembly of claim 9, wherein the first pressure activated device includes one or more of a bellows, a diaphragm, a spring, or a combination thereof.

15. The assembly of claim 9, wherein the second pressure activated device includes one or more of a bellows, a diaphragm, a spring, or a combination thereof.

16. The assembly of claim 9, wherein the first spring comprises a plurality of first springs.

17. The assembly of claim 16, wherein the plurality of first levers is formed of a rigid low friction material or the plurality of second levers is formed of a rigid low friction material.

* * * * *